United States Patent Office 3,424,904
Patented Jan. 28, 1969

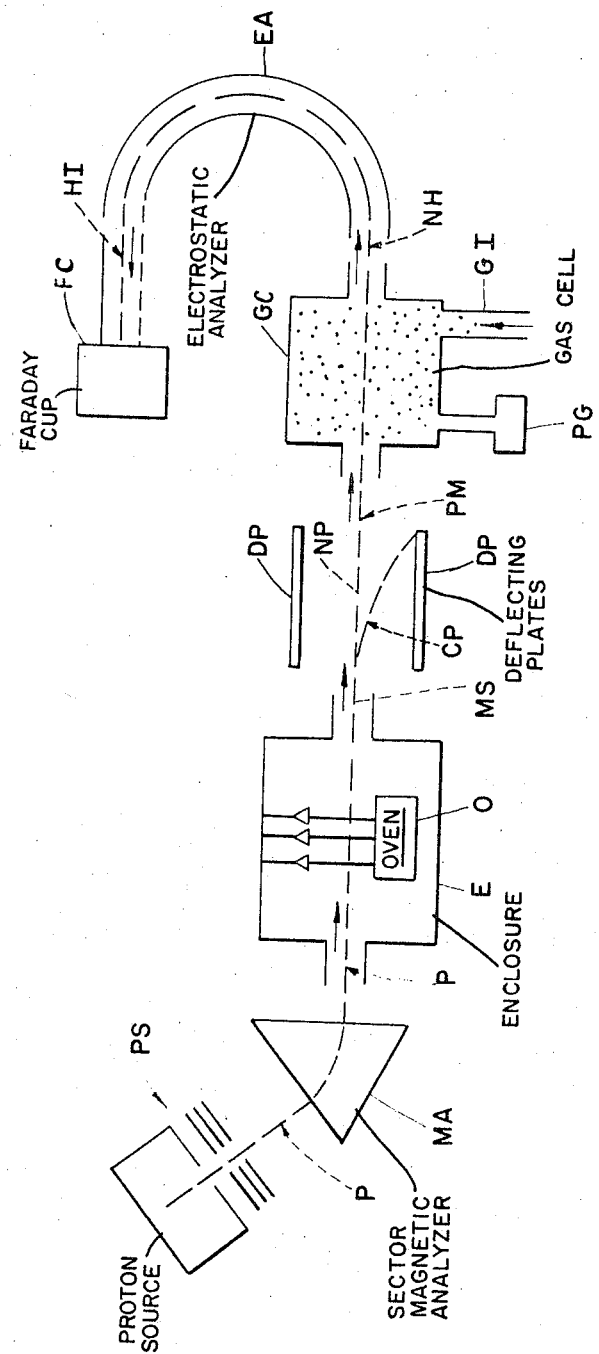

3,424,904
PROCESS FOR PRODUCING NEGATIVE HYDROGEN IONS FROM PROTONS
Bailey L. Donnally, Lake Forest, Ill., assignor to Lake Forest College, Lake Forest, Ill., a not-for-profit corporation of Illinois
Filed May 3, 1965, Ser. No. 452,781
U.S. Cl. 250—84                                16 Claims
Int. Cl. H01j 37/00

ABSTRACT OF THE DISCLOSURE

A beam of relatively low energy negatively charged hydrogen ions may be obtained by passing a beam of relatively low energy (e.g., up to about 2000 electron volts) protons through atoms of an alkali metal in order to produce a beam of particles containing metastable and ground state hydrogen atoms and charged particles. Thereafter, charged particles are deflected from the beam, and the beam (which contains metastable and ground state hydrogen atoms) is passed through a region containing a gas having an ionization energy of at least about 11.0 and preferably at least about 14.0 electron volts in order to selectively negatively ionize the metastable hydrogen atoms in preference to ground state atoms. By subjecting the beam to a magnetic field of sufficient strength to polarize the metastable hydrogen atoms prior to negative ionization, and by conducting the negative ionization step in a weak magnetic field region, the nuclei of the negatively charged hydrogen ions produced are polarized.

---

This invention generally relates to a process for producing negative hydrogen ions, and more specifically to a process for producing metastable hydrogen atoms from protons and converting the metastable hydrogen atoms thereby produced into negative ions having polarized nuclei.

One method for producing beams of metastable hydrogen atoms (i.e., hydrogen atoms, the electrons of which are in the 2s energy level rather than the ground state 1s energy level) was suggested by Madansky et al., Physical Review Letters, 2, 209 (1959). According to this method, metastable hydrogen atoms are obtained by passing a beam of protons through a gas such as molecular hydrogen. However, in practice, the Madansky et al. method has proved to be useful only with proton beams of relatively high energies (e.g., greater than ten thousand electron volts). The prior art method of Madansky et al. cannot be used with protons having energies of up to about two thousand electron volts, and for that reason has little utility for producing relatively low energy metastable hydrogen atoms. Since many experiments on metastable hydrogen atoms require relatively low energy atoms (i.e., atoms moving at relatively low velocities), a process capable of producing relatively low energy metastable atoms is desired.

The prior art also teaches that hydrogen atoms having polarized nuclei could be obtained from metastable hydrogen atoms by quenching the metastable atoms in a magnetic field so as to polarize the metastable atoms. Madansky et al. suggested that polarized metastable hydrogen atoms produced in this manner might be ionized in a weak magnetic field by means of ultraviolet radiation. The passage of the polarized metastable atoms from the strong magnetic field region into the weak field region would result in polarization of the atomic nuclei. However, the described prior art method has not been satisfactory in that substantial numbers of ground state hydrogen atoms are ionized in the background gasses as the beam of atoms passes into the weak field region. For this reason, among others, the described prior art method could not be used to produce relatively intense beams of low energy polarized protons, which beams are essentially free of ions obtained from ground state atoms.

In accordance with the process of the present invention, the disadvantages inherent in the described prior art method are overcome. Thus, a method of producing relatively low energy metastable hydrogen atoms and a method for selectively ionizing metastable atoms in preference to ground state atoms are combined in a new process for producing polarized negative hydrogen ions.

Briefly described, the process of the present invention comprises: passing a beam of relatively low energy (e.g., up to about 2000 electron volts) protons through atoms of a metal selected from the group consisting of cesium, rubidium, potassium, and sodium in order to produce a beam of particles including metastable hydrogen atoms; thereafter deflecting charged particles from the metastable hydrogen atom containing beam and subjecting said beam to a magnetic field of sufficient strength to polarize the metastable hydrogen atoms in order to produce a beam of neutral particles including polarized metastable hydrogen atoms; and passing the beam of neutral particles through a weak magnetic field region containing a gas having an ionization energy of at least about 11.0 electron volts and preferably at least 14.0 electron volts in order to polarize the nuclei of the metastable hydrogen atoms and to selectively ionize metastable hydrogen atoms in preference to ground state hydrogen atoms.

A primary object of the present invention is to provide a method for producing a relatively intense low energy beam of polarized negative hydrogen ions from protons.

Another object of the present invention is to provide a process of the character described which includes a novel method for producing an intense beam of relatively low energy metastable hydrogen atoms.

A further object is to provide a process of the character described which includes a novel method for selectively ionizing metastable hydrogen atoms in preference to ground state hydrogen atoms.

A still further object of the present invention is to provide a method for producing a relatively intense low energy beam of negative hydrogen ions from protons.

These and other objects, advantages, and features of the present invention will hereinafter appear, and, for purposes of illustration, but not of limitation, FIGURE 1 of the accompanying drawing shows—an exemplary embodiment of the present invention which is a schematic flow sheet for the process of the present invention and FIGURE 2 illustrates a key to the symbols used in FIGURE 1.

With reference to the drawing, a beam of protons P (shown in broken lines in the drawing) is obtained from a conventional proton source PS. A Nier-type source in which protons are obtained by electron bombardment of molecular hydrogen may conveniently be utilized as the source PS. The protons of beam P are preferably of relatively low energy, e.g., less than about 2000 electron volts (ev.) and preferably less than about 1000 ev.

The proton beam P is passed through a conventional sector magnetic analyzer MA which directs the beam P into an enclosure E containing an oven O which is adapted to provide a collimated beam of atoms of an operative alkali metal as hereinfter defined. Protons of the beam P capture electrons from the alkali metal atoms and are converted to metastable hydrogen atoms (i.e., hydrogen atoms having electrons in the 2s level) according to the reaction:

where M is an operative alkali metal.

Of the alkali metals, cesium, potassium, rubidium, and sodium may be used to effect the conversion of protons to metastable hydrogen atoms in accordance with the present invention. Cesium is especially effective and for that reason is the preferred alkali metal for use in practicing the present invention.

The probability for an atomic collision occurring (for example, the collision of protons with alkali metal atoms) may roughly be expressed in terms of a reaction cross-section. The larger the cross-section, the more efficient a given atomic collision process. Reaction cross-sections have been measured for the reaction of protons of various energies with cesium vapor in accordance with the present invention. The cross-sections are reported in Table I. The data of Table I verify the effectiveness of the disclosed method for producing metastable hydrogen atoms.

TABLE I.—REACTION CROSS-SECTIONS FOR CESIUM VAPOR

| Proton energy (ev.): | Reaction cross-section ($\times 10^{-14}$ cm.$^2$) |
|---|---|
| 160 | 2.6 |
| 210 | 2.4 |
| 360 | 2.1 |
| 410 | 2.3 |
| 460 | 2.3 |
| 600 | 2.2 |
| 800 | 2.2 |
| 1000 | 2.2 |
| 1500 | 2.2 |
| 2000 | 2.4 |
| 2500 | 2.3 |
| 3000 | 2.1 |

A relatively intense beam of metastable hydrogen atoms MS obtained from the reaction of the proton beam P and the alkali metal atom passes out of the enclosure E. However, beam MS also includes various undesired particles [e.g., protons which did not collide with alkali metal atoms, alkali metal ions, and ground state hydrogen atoms H(1s)]. In order to separate the neutral metastable atoms from the charged particles, the beam MS is passed between a pair of deflecting plates DP. By placing a potential difference across plates DP, an electric field is produced whereby the charged particles (e.g., protons and alkali metal ions) are deflected away from the neutral atoms [e.g., H(2s) and H(1s)]. The deflection of the charged particles is illustrated by a beam CP in the drawing. Thus, via the deflection of beam CP, beam MS is converted into a beam of neutral particles NP including a relatively large number of metastable hydrogen atoms [H(2s)] and probably some ground state hydrogen atoms [H(1s)].

In accordance with a preferred embodiment of the present invention, the metastable hydrogen atoms are polarized prior to their ionization (as hereinafter described). The polarization may be accomplished in a conventional manner, e.g., by passing the beam NP through a relatively strong magnetic field after the beam has passed between plates DP. However, the polarization is most conveniently carried out by providing a magnetic field in the same region as the electric field (i.e., between plates DP) such that both the polarizing and deflecting functions are accomplished simultaneously. As will be obvious to one skilled in the art, it is also possible to carry out the deflecting and polarizing functions with a single magnetic field.

The optimal magnetic field for effecting polarization of the metastable hydrogen atoms is a field of about 575 Gauss, but fields at levels above or below 575 Gauss may be used. However, the efficiency of the polarization decreases at field levels other than the optimal level. A beam of polarized metastable hydrogen atoms PM drifts out of the region between plates DP. As the metastable atoms move out of the strong magnetic field region and into the weak field region, the nuclei of the atoms become polarized. As will be obvious to one skilled in the art, imposition of an appropriate RF transition will production nuclear polarization of about 100% in contrast to the nuclear polarization of about 50% obtained without the RF transition.

The described method for polarizing metastable hydrogen atoms is known and per se forms no part of the present invention. However, in combination with other steps (i.e., production of metastable hydrogen atoms from protons and selectively ionizing the metastable atoms so produced) the polarization step contributes to and is an integral part of the present invention.

The beam of polarized metastable atoms PM, obtained in the foregoing manner, drifts out of the region between plates DP and passes into a conventional gas cell GC. Cell GC is provided with a gas inlet GI and a pressure gauge PG and contains atoms of a gas having an ionization energy greater than about 11.0 ev. and preferably above about 14.0 ev. The metastable atoms of beam PM collide with the gas atoms and the polarized metastable atoms [H(2s)] are preferentially ionized (i.e., substantially no ground state atoms [H(1s)] are ionized) according to the reaction:

$$H(2s) + G \rightarrow H^- + G^+$$

where G is an operative gas as described herein. Thus, a beam NH of polarized negative hydrogen ions, substantially free of ground state ions, passes out of cell GC.

As previously noted, the gases which are operative to selectively ionize metastable hydrogen atoms [H(2s)] in preference to ground state atoms [H(1s)] are those gases having ionization energies of at least about 11.0 and preferably above about 14.0. Operative gases include oxygen, xenon, krypton, carbon monoxide, hydrogen, nitrogen, argon, and helium. Argon and nitrogen are especially preferred.

The yield of ionized metastable hydrogen atoms is influenced by the gas (i.e., the density of the atoms of gas) in the collision region and the length of the collision region. These variables are conveniently expressed in product form as a vapor thickness for the gas. For example, at a pressure of 5 microns of mercury and with a collision length of 5 microns, the vapor thickness is 25 micron-centimeters. In accordance with the present invention, where argon is employed as the gas, optimal preferential ionization of H(2s) occurs at a vapor thickness of about 40 micron-centimeters. However, vapor thicknesses above and below this level may be employed, although with diminished effectiveness.

The beam NH of negative hydrogen ions, obtained via the preferential ionization of metastable hydrogen atoms, is passed through a conventional electrostatic analyzer EA, which directs a relatively intense collimated beam of negative hydrogen ions HI into a conventional Faraday cup FC. The current of negative ions produced is measured by an electrometer (not shown). By carrying out the described steps, a relatively intense collimated beam of polarized negative hydrogen ions may be obtained from metastable hydrogen atoms. Such a beam of negative ions has utility in nuclear physics experiments, for example, in tandem electro-accelerators. In addition, if polarized protons (rather than negative hydrogen ions) are desired, it is only necessary to pass the beam HI through a foil in order to strip the two electrons from the negative hydrogen ions.

The process of the present invention may be illustrated by the following examples.

Example I

Utilizing cesium as the alkali metal in oven O and employing argon as the gas in cell GC, the following reactions occurred respectively in the enclosure E and cell GC:

$$H^+ + Cs \rightarrow H(2s) + Cs^+$$
$$H(2s) + A \rightarrow H^- + A^+$$

Initially, protons were passed from source PS through the oven containing cesium atoms, but no potential was placed across plates DP and no argon was admitted to cell GC. The beam of protons was collected on the backplate of analyzer EA and was measured. The proton current was designated as $I_0$. Thereafter, argon gas was admitted to the cell GC until a pressure of about 0.5 micron of Hg was obtained and the analyzer was adjusted so that negative hydrogen ions were collected and measured on the Faraday cup FC. An electric field was then applied to the region between plates DP and the level of the field was adjusted so that the unreacted protons were deflected, but few metastable hydrogen atoms were quenched to the ground state. The current of negative hydrogen ions obtained from metastable hydrgen atoms was measured and designated as $I_1$. The field between plates DP was then increased in value so as to quench virtually all the metastable atoms to the ground state, and the resulting current of negative ions obtained from ground state hydrogen atoms was measured and designated as $I_2$. Table II reports the ratios $I_1/I_0$; $I_2/I_0$; and $I_1/I_2$ for proton beams of various energies in the range of 600 ev.–3000 ev. The data of Table II verify, that for proton energies up to about 2000 ev., the process of the present invention selectively reduces negative hydrogen ions from metastable hydrogen atoms [$H(2s)$] in preference to ground state hydrogen atoms [$H(1s)$]. This is clearly evidenced by the ratio $I_1/I_2$, since the current $I_1$ is a measure of the current of negative ions from both metastable and ground state atoms, and $I_2$ is the current from ground state atoms alone. The ratio $I_1/I_2$, for proton energies up to the maximum preferred energy of about 1000 ev., is of the order of magnitude of 20:1 or greater. This means that at least 95% of the negative ions formed are from metastable atoms. At the 600 ev. proton energy level, at least 98% of the ions are formed from metastable atoms. Even at the 2000 ev. level, at least 80% of the ions are formed from metastable hydrogen atoms.

TABLE II

| Ion | Ion energy (ev.) | $I_1/I_0$ (×10⁻³) | $I_2/I_0$ (×10⁻⁵) | $I_1/I_2$ |
|---|---|---|---|---|
| H+ | 600 | 1.14 | 1.4 | 81.4 |
| H+ | 800 | 0.57 | 3 | 19.0 |
| H+ | 1,000 | 0.46 | 2.5 | 18.4 |
| H+ | 1,500 | 0.29 | 3.0 | 9.7 |
| H+ | 2,000 | 0.22 | 5.4 | 4.1 |
| H+ | 2,500 | 0.15 | 10 | 1.5 |
| H+ | 3,000 | 0.14 | 11 | 1.3 |

The process of the present invention may be used to produce negative deuterium ions having polarized nuclei if a beam of deuterons is used in place of the beam of protons, as shown in the following example.

Example II

Using the experimental procedure of Example I, $I_0$, $I_1$, and $I_2$ were measured for deuteron beams of various energies in the range 600–1200 ev. The ratios $I_1/I_0$, $I_3/I_0$, and $I_1/I_2$, for this example, are reported in Table III. The data of Table III indicates that metastable deuterium atoms are selectively ionized in preference to ground state deuterium atoms. Thus, the term hydrogen as used in the appended claims should be understood to generically encompass the normal hydrogen isotope [$_1H^1$] and the heavy hydrogen isotope deuterium [$_1D^2$]. Similarly, the term proton therein should be understood to encompass deuterons as well.

TABLE III

| Ion | Ion energy (ev.) | $I_1/I_0$ (×10⁻³) | $I_2/I_0$ (×10⁻⁵) | $I_1/I_2$ |
|---|---|---|---|---|
| D+ | 600 | 1.00 | <3 | >33.3 |
| D+ | 800 | 1.25 | <2 | >62.5 |
| D+ | 1,000 | 1.31 | <2 | >65.5 |
| D+ | 1,200 | 1.00 | 2 | 50 |

As illustrated in Table III, the optimal deuteron energy level for discriminating in favor of metastable atoms and against ground state atoms is somewhat higher than the corresponding level for protons. However, the behavior of deuterium is virtually identical to that of hydrogen when velocities, rather than energies, are compared. Thus, the apparently higher energy range obtained with deuterium is actually attributable to the greater mass of the deuterium atoms.

Example III

Using cesium in oven O and nitrogen in cell GC, $I_0$, $I_1$ and $I_2$ were measured in the foregoing manner. Table IV reports the ratios $I_1/I_0$, $I_2/I_0$, and $I_1/I_2$ for protons and deuterons of various energies. The data of Table IV is illustrative of the utility of nitrogen in selectively ionizing metastable hydrogen atoms in preference to ground state atoms.

TABLE IV

| Ion | Ion energy (ev.) | $I_1/I_0$ (×10⁻³) | $I_2/I_0$ (×10⁻⁵) | $I_1/I_2$ |
|---|---|---|---|---|
| H+ | 600 | 0.83 | 1.7 | 49 |
| H+ | 700 | 0.67 | 3.3 | 20 |
| H+ | 800 | 0.53 | 2.7 | 20 |
| H+ | 1,000 | 0.45 | 3.0 | 15 |
| H+ | 1,200 | 0.38 | 3.9 | 10 |
| H+ | 1,400 | 0.32 | 4.5 | 7.1 |
| H+ | 1,600 | 0.32 | 7.5 | 4.3 |
| H+ | 2,000 | 0.25 | 9.2 | 2.7 |
| H+ | 2,400 | 0.19 | 10.0 | 1.9 |
| H+ | 3,000 | 0.14 | 9.3 | 1.5 |
| D+ | 800 | 0.93 | 4.4 | 21 |
| D+ | 1,000 | 0.96 | 3.3 | 29 |
| D+ | 1,400 | 0.78 | 5.0 | 16 |
| D+ | 1,600 | 0.53 | 5.0 | 11 |

As previously noted, gases having ionization energies greater than about 11.0 electron volts, and preferably greater than about 14.0 electron volts, may be utilized in the cell GC. A gas G having an ionization energy greater than about 11.0 ev. is required so that the internal energies for the reaction:

$$H(2s) + G \rightarrow H^- + G^+$$

are such that high reaction cross-sections are obtained at relatively low proton energies and low reaction cross-sections are obtained for the reaction:

$$H(1s) + G \rightarrow H^- + G^+$$

The relationship of the ionization energy of a given gas to its utility in the process of the present invention is illustrated by the following example.

Example IV $I_1$ and $I_2'$ values were obtained in the previously described manner for various gases using 600 ev. protons. Table V lists the value of the ratios $I_1/I_2$ for the gases together with the ionization energy for the gases. The data of Table V illustrates that gases having ionization energies greater than about 11.0 electron volts, and preferably greater than about 14.0 ev., are suitable for use in carrying out the process of the present invention.

TABLE V

| Gas | Ionization energy (ev.) | $I_1/I_2$ |
|---|---|---|
| Nitric oxide (NO) | 9.4 | 4 |
| Ammonia ($NH_3$) | 10.5 | 3 |
| Hydrogen sulfide ($H_2S$) | 10.5 | 1.5 |
| Oxygen ($O_2$) | 12.1 | 6 |
| Xenon (Xe) | 12.1 | 9 |
| Krypton (Kr) | 14.0 | 42 |
| Carbon monoxide (CO) | 14.1 | 17 |
| Hydrogen ($H_2$) | 15.4 | 50 |
| Nitrogen ($N_2$) | 15.6 | 50 |
| Argon (A) | 15.8 | 90 |
| Helium (He) | 24.0 | 30 |

While the process of the present invention is especially designed for the production of polarized metastable hydrogen ions, the process may also have utility for producing unpolarized negative ions, particularly for use under conditions where it is desired to alternately provide polarized and unpolarized ions. Moreover, although the steps employed in the process are an integral part of a single process for obtaining a relatively intense beam of low energy polarized hydrogen ions from protons, the steps may also have independent utility. For example, the described reaction between protons and alkali metal vapor may be used to produce relatively intense beams of low energy metastable hydrogen atoms for any purpose. In addition, by quenching all of the metastable hydrogen atoms to the ground state, a relatively intense collimated beam of ground state atoms may be obtained. Likewise, polarized metastable hydrogen atoms from any source can be selectively ionized in preference to ground state atoms by the described collision reaction with a gas.

While the process of the present invention has been described with reference to certain preferred embodiments, it will be obvious to one skilled in the art that various changes, alterations, and modifications may be made in reactants and reaction conditions without departing from the spirit and the scope of the appended claims.

What is claimed is:

1. A process for producing polarized negative hydrogen ions comprising:
    passing a beam of protons having relatively low energies in the range of up to about 2000 electron volts through atoms of a metal selected from the group consisting of cesium, rubidium, potassium, and sodium in order to produce a beam of particles comprising metastable and ground state hydrogen atoms and charged particles;
    thereafter deflecting charged particles from the metastable hydrogen atom containing beam and subjecting said beam to a magnetic field of sufficient strength to polarize the metastable hydrogen atoms in order to produce a beam of neutral particles comprising polarized metastable and ground state hydrogen atoms; and
    passing the beam of neutral particles through a weak magnetic field region containing a gas having an ionization energy of at least about 11.0 electron volts in order to selectively negatively ionize polarized metastable hydrogen atoms in preference to ground state hydrogen atoms.

2. A process, as claimed in claim 1, wherein the metal is cesium and the gas is argon.

3. A process, as claimed in claim 1, wherein the metal is cesium and the gas is nitrogen.

4. A process for producing polarized negative hydrogen ions comprising:
    passing a beam of protons having energies of about 160 and up to about 1000 electron volts through atoms of cesium in order to produce a beam of particles comprising metastable and ground state hydrogen atoms and charged particles;
    thereafter deflecting charged particles from the metastable hydrogen atom containing beam and subjecting said beam to a magnetic field of about 575 Gauss in order to polarize the metastable hydrogen atoms so as to produce a beam of neutral particles comprising ground state and polarized metastable hydrogen atoms; and
    passing the beam of neutral particles through a weak magnetic field region containing a gas having an ionization energy of at least 14.0 electron volts in order to selectively negatively ionize polarized metastable hydrogen ions in preference to ground state hydrogen atoms.

5. A process, as claimed in claim 4, wherein the gas is argon.

6. A process, as claimed in claim 4, wherein the gas is nitrogen.

7. A process for producing negative hydrogen ions comprising:
    passing a beam of protons having relatively low energies in the range of up to about 2000 electron volts through atoms of a metal selected from the group consisting of cesium, rubidium, potassium, and sodium in order to produce a beam of particles comprising metastable and ground state hydrogen atoms and charged particles;
    thereafter deflecting charged particles from the metastable hydrogen atom containing beam in order to provide a beam of neutral particles comprising metastable and ground state hydrogen atoms; and
    passing the beam of neutral particles through a gas having an ionization energy of at least about 11.0 electron volts in order to selectively negatively ionize metastable hydrogen atoms in preference to ground state hydrogen atoms.

8. A process, as claimed in claim 7, wherein the metal is cesium and the gas is argon.

9. A process, as claimed in claim 7, wherein the metal is cesium and the gas is nitrogen.

10. A process for producing negative hydrogen ions comprising:
    passing a beam of protons having energies of about 160 up to about 1000 electron volts through atoms of cesium in order to produce a beam of particles comprising metastable and ground state hydrogen atoms and charged particles;
    deflecting charged particles from the metastable hydrogen atom containing beam in order to deflect charged particles away from the beam and thereby produce a beam of neutral particles comprising metastable and ground state hydrogen atoms; and
    passing the beam of neutral particles through a gas having an ionization energy of at least about 14.0 electron volts in order to selectively negatively ionize metastable hydrogen atoms in preference to ground state hydrogen atoms.

11. A process, as claimed in claim 10, wherein the gas is argon.

12. A process, as claimed in claim 10, wherein the gas is nitrogen.

13. A process for producing metastable hydrogen atoms comprising:
    passing a beam of protons having energies of about 160 up to about 2000 electron volts through atoms of a metal selected from the group consisting of cesium, rubidium, potassium, and sodium in order to produce a beam of particles comprising metastable hydrogen atoms and charged particles; and
    thereafter deflecting charged particles from the metastable hydrogen atom containing beam in order to provide a beam of neutral particles comprising metastable hydrogen atoms.

14. A process for producing polarized negative hydrogen ions from metastable hydrogen atoms comprising:
    subjecting a metastable hydrogen atom containing beam to a magnetic field of sufficient strength to polarize the metastable hydrogen atoms in order to provide a beam of particles comprising polarized metastable and ground state hydrogen atoms; and
    passing the polarized metastable hydrogen atom containing beam through a weak magnetic field region containing a gas having an ionization energy of at least about 11.0 electron volts in order to selectively negatively ionize polarized metastable hydrogen atoms in preference to ground state hydrogen atoms.

15. A process, as claimed in claim 14, wherein the gas is nitrogen.

16. A process, as claimed in claim 14, wherein the gas is argon.

References Cited

UNITED STATES PATENTS 3,136,908   6/1964   Weinman _____ 313—63

WILLIAM F. LINDQUIST, *Primary Examiner.*

U.S. Cl. X.R.

250—42; 313—63